(12) United States Patent
Kuo

(10) Patent No.: US 8,503,415 B2
(45) Date of Patent: Aug. 6, 2013

(54) WIRELESS ACCESS POINT AND DATA TRANSMISSION METHOD THEREOF

(75) Inventor: Shao-Ming Kuo, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 305 days.

(21) Appl. No.: 12/942,982

(22) Filed: Nov. 9, 2010

(65) Prior Publication Data

US 2012/0033564 A1 Feb. 9, 2012

(30) Foreign Application Priority Data

Aug. 3, 2010 (CN) .......................... 2010 1 0242355

(51) Int. Cl.
*H04W 4/00* (2009.01)

(52) U.S. Cl.
USPC .......................................................... 370/338

(58) Field of Classification Search
USPC ................... 370/311–313, 328–339
See application file for complete search history.

(56) References Cited

U.S. PATENT DOCUMENTS

| | | | |
|---|---|---|---|
| 7,577,434 B2 * | 8/2009 | Nakano et al. | 455/436 |
| 8,189,545 B2 * | 5/2012 | Irie et al. | 370/338 |
| 2008/0080433 A1 * | 4/2008 | Cromer et al. | 370/338 |

* cited by examiner

*Primary Examiner* — Frank Duong
(74) *Attorney, Agent, or Firm* — Altis Law Group, Inc.

(57) ABSTRACT

In a data transmission method of a wireless access point (WAP), the WAP determines whether a probe request frame transmitted from a mobile device is present in a wireless network. The WAP further transmits a beacon frame in response to the probe request frame when the probe request frame is present in the wireless network.

9 Claims, 3 Drawing Sheets

WIRELESS ACCESS POINT AND DATA TRANSMISSION METHOD THEREOF

BACKGROUND

1. Technical Field

The present disclosure relates to a wireless access point (WAP) and a data transmission method of the wireless access point.

2. Description of Related Art

Wireless access points (WAPs) are critical components in a wireless network. The WAPs must periodically transmit beacon frames to announce their presence and service set identifiers (SSIDs) in the WLAN based on IEEE 802.11 standards. However, the WAPs continue to transmit beacon frames even if no mobile device is present in the WLAN, such that power of the WAPs is wasted.

DETAILED DESCRIPTION

Figure 1:
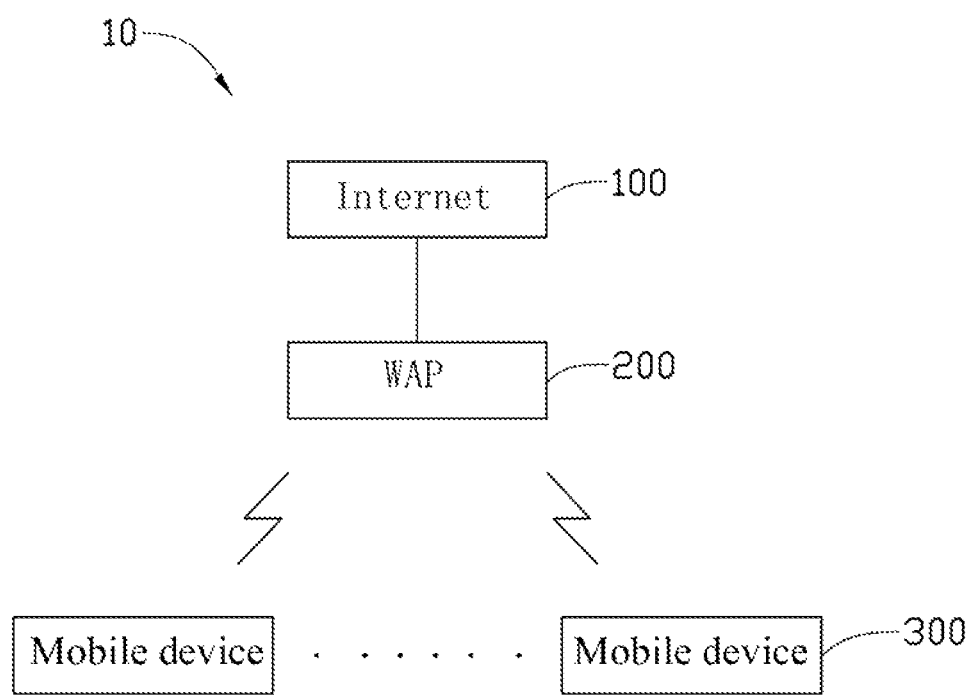
FIG. 1 is a schematic view of one embodiment of a wireless network system.

FIG. 1 is a schematic view of one embodiment of a wireless network system 10. The wireless network system 10 includes Internet 100, a wireless access point (WAP) 200, and at least one mobile device 300. The Internet 100 is provided by Internet service providers (ISPs). The WAP 200 provides a wireless network by which the mobile device 300 accesses the Internet 100. The mobile device 300 may be a mobile phone, a laptop computer, or a mobile Internet device (MID), for example.

In general, the word "module" as used herein, refers to logic embodied in hardware or firmware, or to a collection of software instructions, written in a programming language, such as, for example, Java, C, or assembly. One or more software instructions in the unit may be integrated in firmware, such as an EPROM. It will be appreciated that module may comprise connected logic units, such as gates and flip-flops, and may comprise programmable units, such as programmable gate arrays or processors. The unit described herein may be implemented as either software and/or hardware unit and may be stored in any type of computer-readable medium or other computer storage device.

Figure 2:
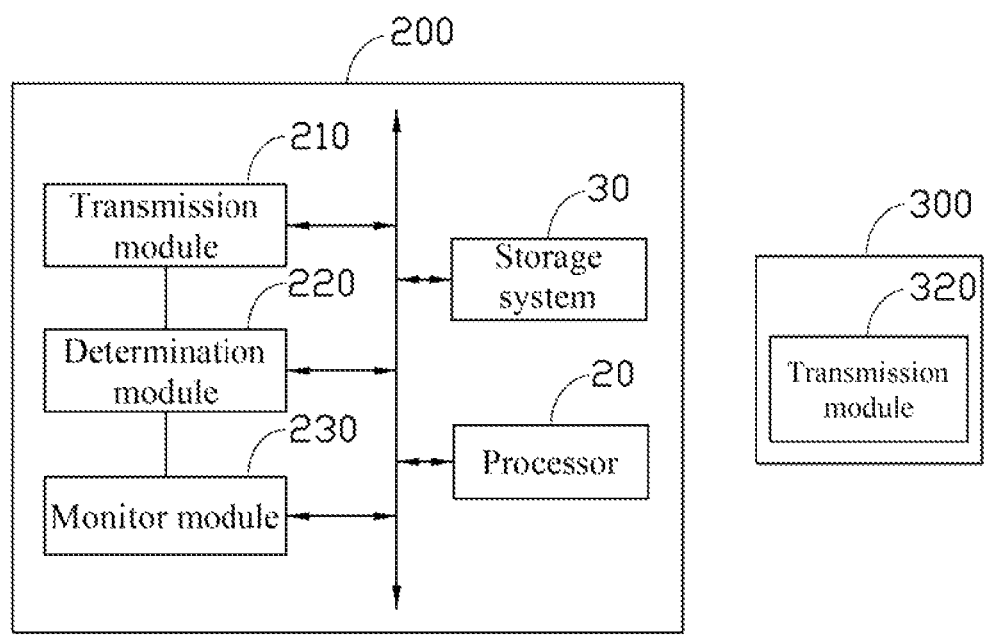
FIG. 2 is a block diagram of one embodiment of a wireless access point (WAP).

FIG. 2 is a block diagram of one embodiment of the WAP 200 in communication with the mobile device 300. The WAP 200 includes a storage system 20, a processor 30, a transmission module 210, a determination module 220, and a monitor module 230. The modules 210-230 may comprise computerized code in the form of one or more programs that are stored in the storage system 20. The computerized code includes instructions that are executed by the processor 30 to provide functions for the modules 210-230.

The mobile device 300 includes a transmission module 320. The transmission module 320 may transmit a probe request frame to the wireless network. The probe request frame contains information about the network with which the mobile device 300 desires to communicate as well as information about the mobile device 300 itself. Thus, the mobile device 300 may be recognized by the WAP 200.

The determination module 220 may determine whether a frame relative to IEEE 802.11 standards is present in the wireless network. The frame relative to IEEE 802.11 standards may include the probe request frame, an association request frame, and a disassociation request frame, for example. The determination module 220 further determines whether the probe request frame is present in the wireless network. The transmission module 210 transmits a probe response frame and a beacon frame in response to the probe request frame when the probe request frame is present in the wireless network.

The monitor module 230 monitors wireless connection between the WAP 200 and the mobile device 300 when the WAP 200 is in communication with the mobile device 300. The determination module 220 determines whether the wireless connection is disconnected. The transmission module 210 terminates the transmission of the beacon frame when the wireless connection between the WAP and the mobile device is disconnected.

Figure 3:
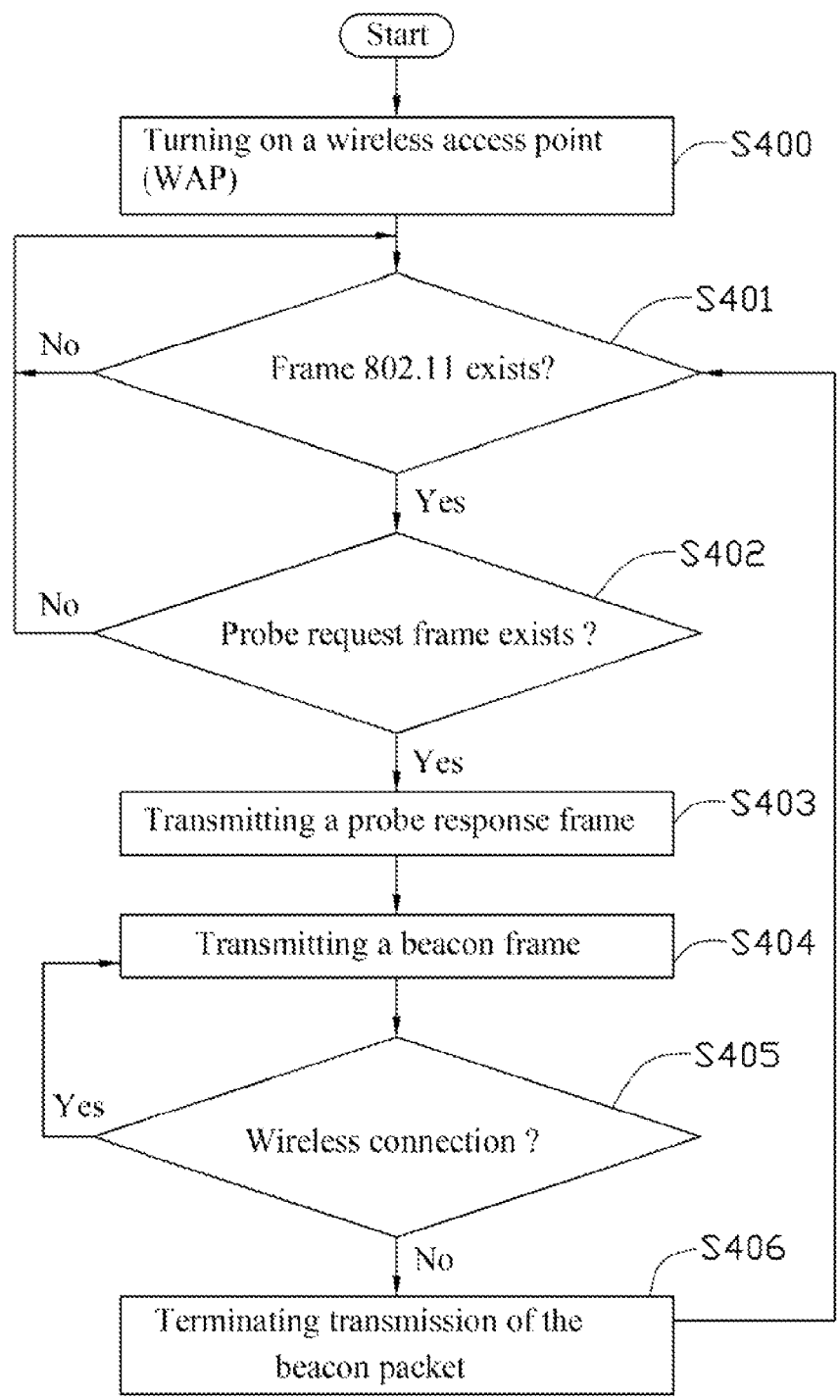
FIG. 3 is a flowchart illustrating one embodiment of a data transmission method of a wireless access point (WAP).

FIG. 3 is a flowchart illustrating one embodiment of a data transmission method of WAP 200. Depending on the embodiment, additional blocks may be added, others removed, and the ordering of the blocks may be changed.

In block S400, the WAP 200 is turned on.

In block S401, the determination module 220 determines whether the frame relative to IEEE 802.11 standards is present in the wireless network. If no frame relative to IEEE 802.11 standards is present in the wireless network, block S401 is repeated.

If the frame relative to IEEE 802.11 standards is present in the wireless network, in block S402, the determination module 220 further determines whether the probe request frame is present in the wireless network. If no probe request frame is present in the wireless network, block S401 is repeated.

If the probe request frame is present in the wireless network, in block S403, the transmission module 210 transmits the probe response frame in response to the probe request frame.

In block S404, the transmission module 210 further transmits the beacon frame in response to the probe request frame.

In block S405, the determination module 220 determines whether the wireless connection is disconnected when the WAP 200 is in communication with the mobile device 300. If the wireless connection remains, block S404 is repeated.

If the wireless connection is disconnected, in block S406, the transmission module 210 terminates the transmission of the beacon frame, and block S401 is repeated.

The present disclosure provides a data transmission method of a wireless access point (WAP). The power consumption of the WAP may be reduced when no mobile device is present in a wireless network provided by the WAP.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computer-implemented data transmission method of a wireless access point (WAP), the WAP providing a wireless network, the method comprising:

determining whether a probe request frame transmitted from a mobile device is present in the wireless network;

transmitting a beacon frame in response to the probe request frame;

determining whether a wireless connection between the WAP and the mobile device is disconnected; and terminating the transmission of the beacon frame when the wireless connection between the WAP and the mobile device is disconnected.

2. The method of claim 1, further comprising:
determining whether a frame relative to IEEE 802.11 standards is present in the wireless network.

3. The method of claim 1, further comprising:
transmitting a probe response frame in response to the probe request frame.

4. A wireless access point (WAP), capable of providing a wireless network, comprising:
a storage system;
at least one processor;
one or more programs stored in the storage system and being executable by the at least one processor, the one or more programs comprising:
a determination module operable to determine whether a probe request frame transmitted from a mobile device is present in the wireless network;
a transmission module operable to transmit a beacon frame in response to the probe request frame;
a monitor module operable to monitor a wireless connection between the WAP and the mobile device; and
the transmission module further operable to terminate the transmission of the beacon frame when the wireless connection between the WAP and the mobile device is disconnected.

5. The WAP of claim 4, wherein the determination module further determines whether the frame relative to IEEE 802.11 standards is present in the wireless network.

6. The WAP of claim 4, wherein the transmission module further transmits a probe response frame in response to the probe request frame.

7. A non-transitory storage medium having stored thereon instructions that, when executed by a processor, causing the processor to perform a data transmission method of a wireless access point (WAP), the WAP providing a wireless network, wherein the method comprises:
determine whether a probe request frame transmitted from a mobile device is present in the wireless network;
transmit a beacon frame in response to the probe request frame;
determine whether a wireless connection between the WAP and the mobile device is disconnected; and
terminate the transmission of the beacon frame when the wireless connection between the WAP and the mobile device is disconnected.

8. The non-transitory storage medium of claim 7, wherein the method further comprises:
determine whether a frame relative to IEEE 802.11 standards is present in the wireless network.

9. The non-transitory storage medium of claim 7, wherein the method further comprises:
transmit a probe response frame in response to the probe request frame.

* * * * *